(12) United States Patent
Park et al.

(10) Patent No.: US 7,773,251 B2
(45) Date of Patent: Aug. 10, 2010

(54) METHOD AND APPARATUS TO PROCESS SCANNED IMAGES

(75) Inventors: Eun-ok Park, Suwon-si (KR);
Kang-hoon Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1597 days.

(21) Appl. No.: 11/043,046

(22) Filed: Jan. 27, 2005

(65) Prior Publication Data

US 2005/0162714 A1    Jul. 28, 2005

(30) Foreign Application Priority Data

Jan. 28, 2004    (KR) .................... 10-2004-0005308

(51) Int. Cl.
*G06F 15/00* (2006.01)
*H04N 1/387* (2006.01)
*H04N 1/393* (2006.01)

(52) U.S. Cl. .................... 358/1.2; 358/450; 358/451

(58) Field of Classification Search .............. 358/400, 358/404, 444, 443, 1.2, 1.6, 1.12, 1.16, 450, 358/451, 468, 483, 464
See application file for complete search history.

(56) References Cited

U.S. PATENT DOCUMENTS

| | | | |
|---|---|---|---|
| 5,051,843 A * | 9/1991 | Hayashi ...................... 358/450 |
| 6,469,746 B1 * | 10/2002 | Maida ........................ 348/564 |
| 6,643,028 B1 * | 11/2003 | Ogaki et al. ................. 358/1.6 |
| 7,046,279 B2 * | 5/2006 | Yamanaka et al. ....... 348/229.1 |
| 7,352,898 B2 * | 4/2008 | Kitagawara et al. ......... 382/173 |
| 7,411,623 B2 * | 8/2008 | Shibutani .............. 348/333.02 |
| 7,443,447 B2 * | 10/2008 | Shirakawa .................. 348/376 |
| 2002/0044809 A1 * | 4/2002 | Hayashi et al. ............. 399/391 |
| 2003/0100976 A1 * | 5/2003 | Watanabe et al. .............. 701/1 |

(Continued)

FOREIGN PATENT DOCUMENTS

CN           1074176           7/1993

(Continued)

OTHER PUBLICATIONS

Chinese Office Action dated May 11, 2007 issued in CN2005100058304.

(Continued)

*Primary Examiner*—Jerome Grant, II
(74) *Attorney, Agent, or Firm*—Stanzione & Kim, LLP (57) ABSTRACT

There are provided a scanned image processing method and a scanned image processing apparatus to create a plurality of page images (PI) by sequentially scanning two or more printed papers in a predetermined resolution, reducing the created page images, arranging the reduced page images (RPI) in integrated page region (IPR), and creating one integrated page image. The method includes setting the scan environment by a user, dividing the integrated page region if a multi scan request is input from the user, creating and storing page images by sequentially scanning printed papers to be fed according to a predetermined method, reducing the stored page images by a predetermined ratio, creating and storing the reduced page images, and creating one integrated page image by reading the reduced, stored page images and arranging in a predetermined arranging order, whereby the file can be managed more efficiently.

21 Claims, 6 Drawing Sheets

U.S. PATENT DOCUMENTS

| | | | |
|---|---|---|---|
| 2003/0107593 A1* | 6/2003 | Domenico | 345/752 |
| 2004/0169742 A1* | 9/2004 | Shibutani et al. | 348/231.5 |
| 2005/0041035 A1* | 2/2005 | Nagatomo et al. | 345/601 |
| 2005/0185204 A1* | 8/2005 | Shelton et al. | 358/1.13 |
| 2006/0013481 A1* | 1/2006 | Park et al. | 382/170 |
| 2006/0098112 A1* | 5/2006 | Kelly | 348/333.12 |

FOREIGN PATENT DOCUMENTS

| | | |
|---|---|---|
| CN | 1174344 | 2/1998 |
| JP | 10-073973 | 3/1998 |
| JP | 10-307908 | 11/1998 |
| JP | 11-252326 | 7/1999 |
| JP | 2000-172694 | 6/2000 |
| JP | 2001-160882 | 6/2001 |
| KR | 2003-32275 A | 4/2003 |

OTHER PUBLICATIONS

Office Action issued Sep. 29, 2005, for KR 10-2004-0005308.

Chinese Office Action dated Nov. 17, 2006 issued in CN 200510005830.4.

* cited by examiner

METHOD AND APPARATUS TO PROCESS SCANNED IMAGES

CROSS-REFERENCE TO RELATED APPLICATIONS

This application claims the benefit of Korean Patent Application No. 10-2004-5308, filed on Jan. 28, 2004, in the Korean Intellectual Property Office, the disclosure of which is incorporated herein in its entirety and by reference.

BACKGROUND OF THE INVENTION

1. Field of the Invention

The present general inventive concept relates to a method and an apparatus to process scanned images, and more particularly, to a method and an apparatus to process scanned images by sequentially scanning two or more printed papers with a predetermined resolution to create a plurality of page images (PI), reducing the created page images, arranging the reduced page images (RPI) in an integrated page region (IPR), and thus creating one integrated page image.

2. Description of the Related Art

Generally, when a scanning operation is performed using a conventional apparatus having a scanning function, the same number of image files are created as pages scanned if a selected image file format does not support a multi-page function. In addition, even if the image file format supports the multi-page function, the image files are separately stored and connected to each other by using, for example, flags in the image file format. In other words, the image files are not provided as one page.

SUMMARY OF THE INVENTION

The present general inventive concept provides a method and an apparatus to process scanned images by creating a plurality of page images (PI) by sequentially scanning two or more printed papers with a predetermined resolution, reducing the created page images, arranging the reduced page images (RPI) in an integrated page region (IPR), and thus creating one integrated page image.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are substantially realized by providing a method of processing scanned images by creating a plurality of page images by sequentially scanning two or more printed papers, reducing the plurality of page images, arranging a plurality of reduced page images in an integrated page region to create one integrated page image, the method comprising setting a scan environment by a user, the scan environment including the number of the plurality of printed papers to be scanned and an arrangement order of the plurality of reduced page images, dividing the integrated page region when a multi scan request is input from the user, creating and storing the plurality of page images by sequentially scanning the plurality of printed papers, creating and storing the plurality of reduced page images by reducing the plurality of stored page images by a predetermined ratio, and creating one integrated page image by reading the plurality of reduced page images and arranging the plurality of reduced page images in a predetermined arrangement order in the integrated page region.

The method may further comprise transmitting the integrated page image to an external device.

The external device may be a terminal.

The printed papers may be fed manually or automatically.

The dividing of the integrated page region when a multi scan request is input from the user may comprise dividing the integrated page region into a plurality of page regions of which a number is equal to a number of the plurality of printed papers set by the user if the number of the plurality of printed papers set by the user is an even number, or dividing the integrated page region into an even number of page regions by adding 1 to the number of the plurality of printed papers set by the user if the number of the plurality of printed papers set by the user is an odd number.

The sizes of the divided regions in the integrated page region may be equal to one another.

The predetermined ratio may be a ratio of a size of the divided page region to a size of at least one of the plurality of page images, and may be determined based on a resolution of at least one of the plurality of page images and a resolution of the integrated page image.

The arrangement order may be selected by the user from predetermined formats.

The scan environment may be set by using a terminal or a liquid crystal display.

The foregoing and/or other aspects and advantages of the present general inventive concept may also be substantially realized by providing an apparatus to process scanned images comprising an image creating means for creating images for two or more printed papers by sequentially scanning the plurality of printed papers, an image integration means for producing reduced images by reducing the created images and arranging the reduced images into one integrated page region, and a control means for controlling the image creating means and the image integration means. The apparatus may further comprise a storage means for storing the images created in the image creating means and the reduced images created in the image integration means.

The control means may control the image creation means to create the images by scanning a plurality of printed papers, control the image integration means to create the reduced images by reducing the images created in the image creation means and to create one integrated image by arranging the reduced images in the integrated page region, and control the storage means to store the created images and the reduced images.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
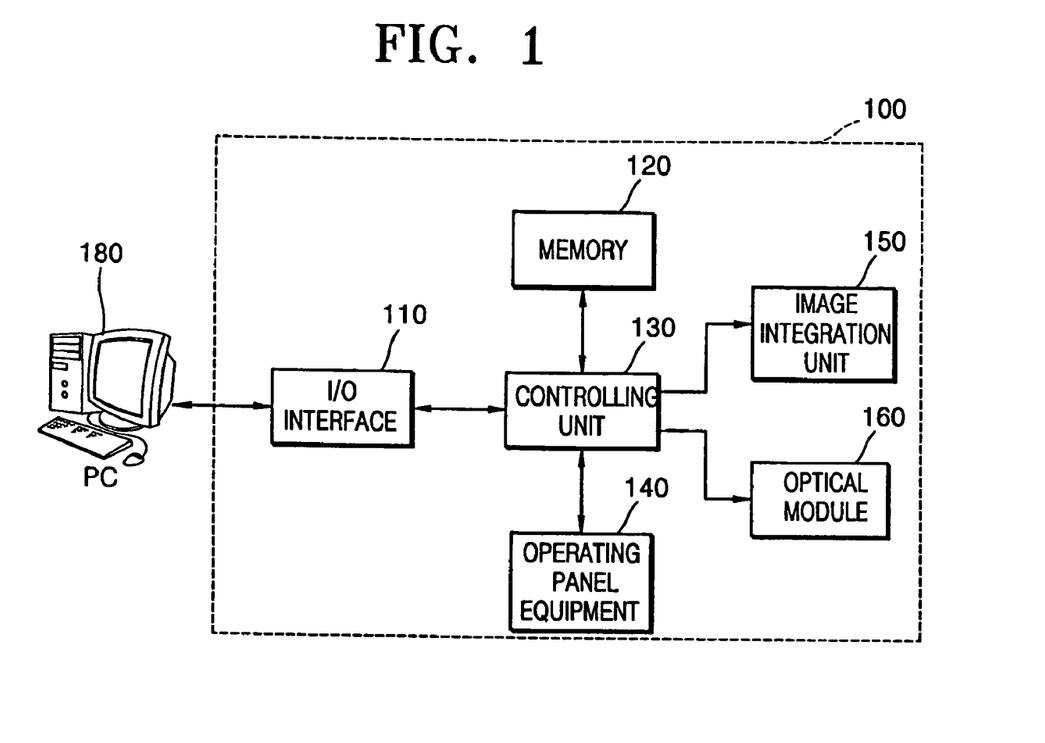
FIG. 1 is a block diagram of an image processing apparatus according to an embodiment of the present general inventive concept.

FIG. 1 is a block diagram of an image processing apparatus 100 according to an embodiment of the present general inventive concept. The image processing apparatus may comprise an I/O interface unit 110, a memory 120 (also referred to in this disclosure as a "storage unit"), a controlling unit 130, operating panel equipment (OPE) 140, an image integration unit 150, and an optical module 160.

The I/O interface unit 110 interfaces with both the image processing apparatus 100 and a terminal 180 when a scan environment (SE) set by a user is transmitted from the terminal 180 to the image processing apparatus 100, or when an integrated page image created in the image processing apparatus 100 is transmitted to the terminal 180.

The memory 120 is connected to the controlling unit 130 and stores page images (PI) created by the optical module 160 in accordance with instructions of the controlling unit 130, and stores reduced page images (RPI) created by the image integration unit 150.

The operating panel equipment 140 creates various key data transmitted to the controlling unit 130 by setting the scan environment, and may include a liquid crystal display (LCD) which displays the scan operation. The operating panel equipment 140 may be embodied as various devices, such as a touch screen or the like.

The image integration unit 150 is connected to the controlling unit 130 and creates the reduced page images by reading page images stored in the storage unit 120 according to instructions of the controlling unit 130 and reducing them by a predetermined ratio. Further, by arranging the reduced page images in an integrated page region (IPR) in a predetermined order, one integrated page image (IPI) can be created.

The optical module 160 creates page images by scanning a plurality of printed papers in a predetermined resolution according to instructions of the controlling unit 130 and stores the page images in the memory 120. The scanning can be accomplished by feeding the plurality of printed papers to the optical module 160 manually, as in a flat-bed type scanner, or automatically by feeding the plurality of printed papers from a feeder cassette.

If a multi scan request (MSR) is input from the terminal 180, the controlling unit 130 can control the optical module 160 to create page images by sequentially scanning the plurality of printed papers. In addition, the controlling unit 130 can control the image integration unit 150 to reduce the page images created in the optical module 160 to create reduced page images, and can control the image integration unit 150 to create an integrated page image by arranging each of the reduced page images into a respective page region in a predetermined order on an integrated page region. Furthermore, the controlling unit 130 can control the storage unit 120 to store the page images and the reduced page images in the storage unit 120 and to transmit the created integrated page image to the terminal 180. The reduced page images could alternatively be arranged into more than just one page region and/or into more than just one integrated page image.

Figure 2:
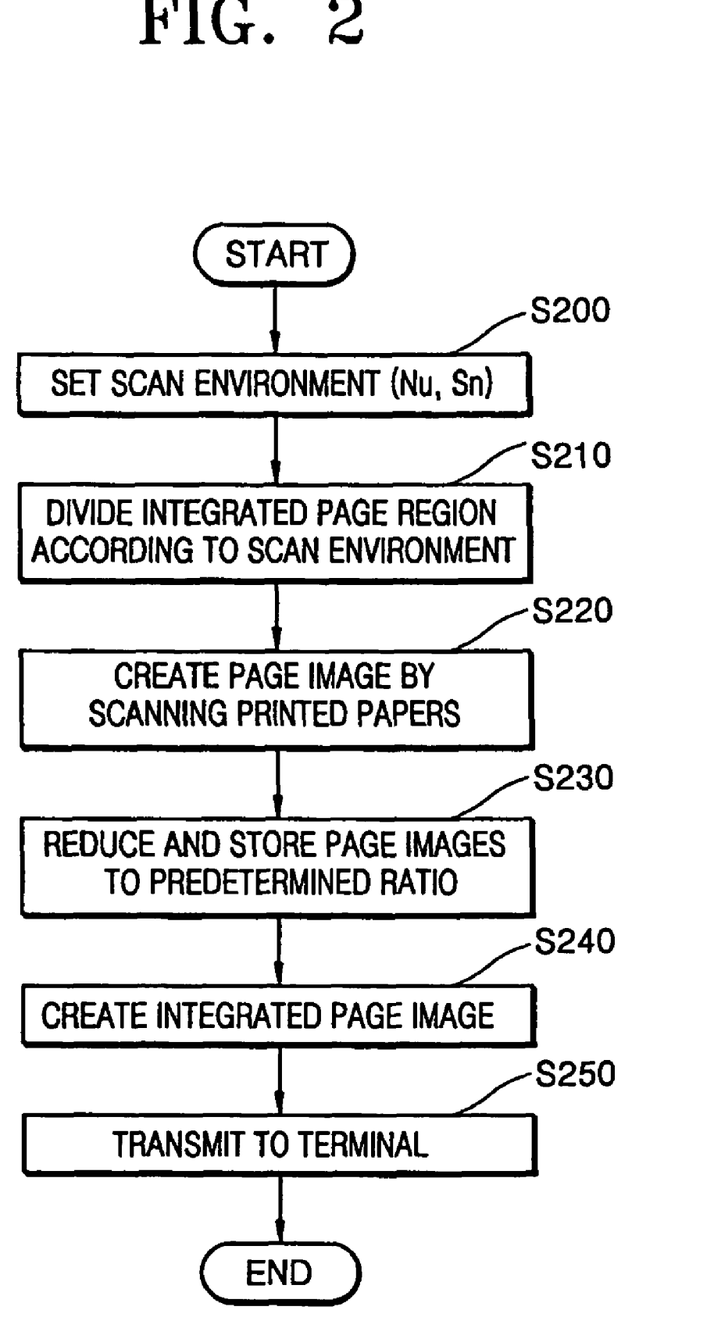
FIG. 2 is a flowchart illustrating a method of processing scanned images according to an embodiment of the present general inventive concept.

FIG. 2 is a flowchart illustrating a method of processing scanned images according to an embodiment of the present general inventive concept. The method of processing scanned images comprises setting a scan environment (operation S200), dividing an integrated page region into a plurality of page regions (operation S210), creating page images (operation S220), creating reduced page images (operation S230), creating an integrated page image (operation S240), and transmitting the integrated page image to a terminal (operation S250).

Figure 3:
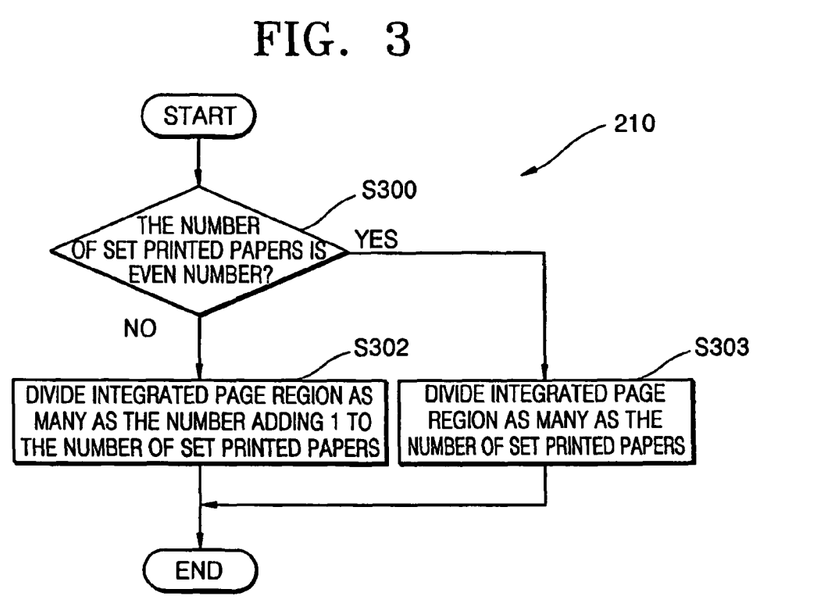
FIG. 3 is a flowchart illustrating in detail the dividing an integrated page region operation of FIG. 2.

FIG. 3 is a flowchart illustrating in detail the operation of dividing the integrated page region (operation S210) of FIG. 2. The operation of dividing the integrated page region into a plurality of page regions (operation S210) comprises determining whether the number of printed papers set by a user is an odd number or an even number (operation S300) and dividing the integrated page region accordingly (operations S302 or S303). This process is described in more detail below.

Figure 4:
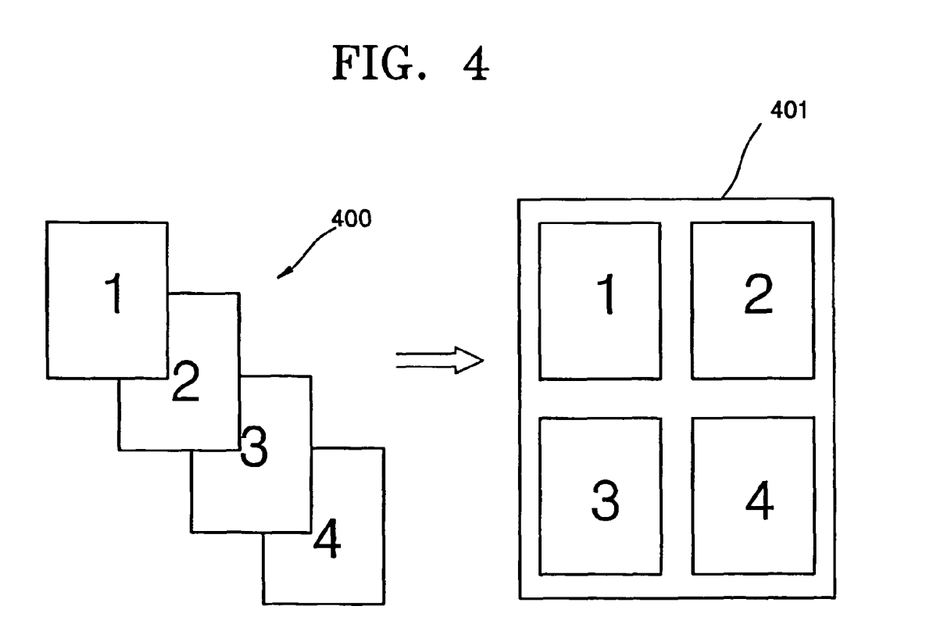
FIG. 4 is a schematic diagram illustrating a plurality of page images arranged in one integrated page image region according to an embodiment of the present general inventive concept.
Figure 5:
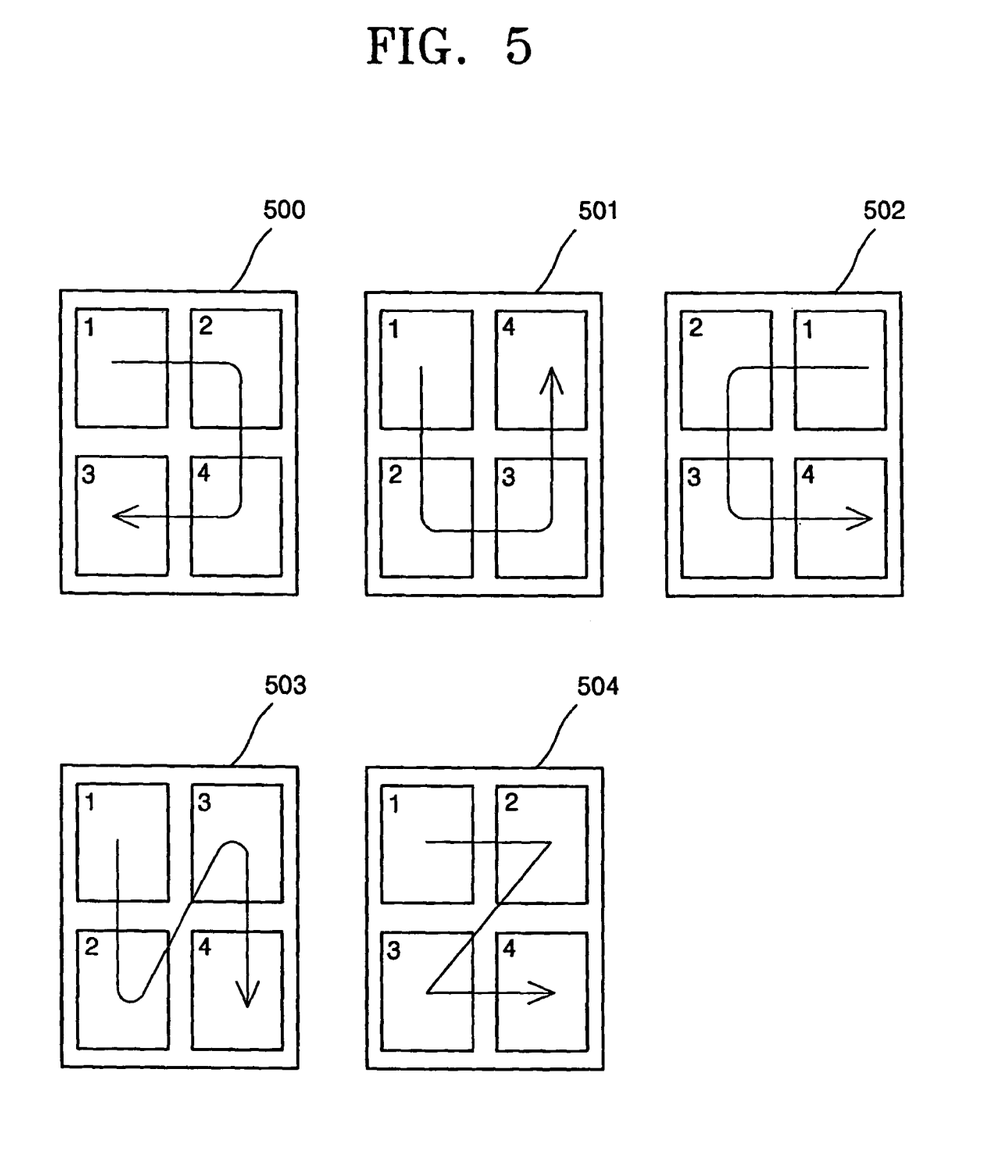
FIG. 5 is a schematic diagram illustrating examples of an arrangement order according to an embodiment of the present general inventive concept.
Figure 6:
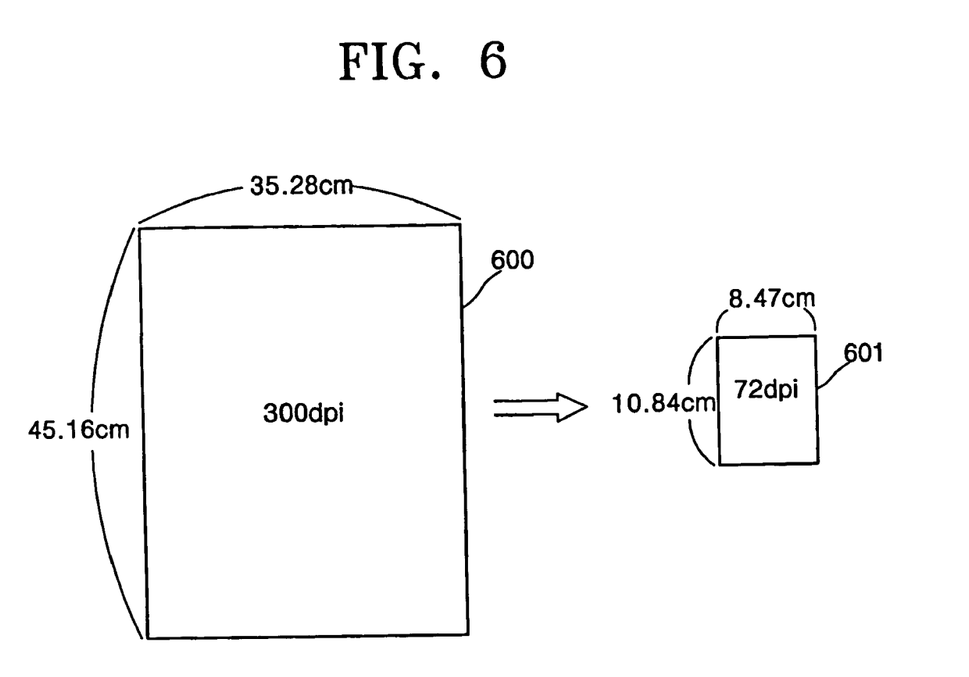
FIG. 6 is a schematic diagram illustrating image sizes of a page image before and after reducing the page image.

FIG. 4 is a schematic diagram illustrating a plurality of page images 400 arranged in one integrated page image region 401 according to an embodiment of the present general inventive concept. FIG. 5 is a schematic diagram illustrating examples 500 through 504 of an arrangement order according to an embodiment of the present general inventive concept. FIG. 6 is a schematic diagram illustrating image sizes of a page image before (600) and after (601) reducing the page image.

Now, a method of processing scanned images according to an embodiment of the present general inventive concept will be described with reference to FIGS. 2 to 6.

First, a user sets the scan environment (operation S200). The scan environment can be set by using a scanner driver program (not shown) installed on the terminal 180 or by using a key input from the operating panel equipment 140 of the image processing apparatus 100.

Usually, scanning is accomplished through two processes. First, a user puts a paper to be scanned on a scanner and selects a scanner driver (not shown) by using a graphic program. The entire page image is scanned in a predetermined resolution by executing a preview command.

Second, after selecting only a specific portion of the image to be scanned using the graphic program, a more precise scanning is performed in a higher resolution to obtain a clearer image. Since the higher resolution scanning of the specific portion results in more pixels (or a higher dots per inch measure (dpi)) representing the image, it takes more time correspondingly. However, according to the present embodiment, only the first process is accomplished, resulting in a faster scanning process.

Throughout this disclosure, the scan environment refers to the conditions under which the scanning is accomplished. For example, the scan environment includes the number (Nu) of printed papers to be scanned, the scan resolution, and the arrangement order (Sn) of the reduced page images.

In the operation of dividing the integrated page region (operation S210), a virtual page region, that is, an integrated page region, is divided into a predetermined number of regions based on the scan environment set by a user. The integrated page region is divided into an even number of regions regardless of whether the number of printed papers set by a user is even or odd. If, for example, a user sets the number of printed papers to be scanned in the scan environment to 3, the virtual page region (integrated page region) is divided into 4 small regions. (1 region is added to the 3 regions representing the number of printed papers set by the user). These processes are shown in FIG. 3.

Referring to FIG. 3, it is determined whether or not the number of printed papers set by a user is an even number (operation S300). If the number of printed papers is an even number, the integrated page region is divided based on a user's input (operation S303). However, if the number of printed papers set by a user is an odd number, the controlling unit 130 divides the integrated page region into an even number of pages by adding 1 to the odd number (operation S302).

In the operation of creating page images (operation S220), a scan operation is sequentially accomplished for the printed papers in a predetermined resolution based on the scan environment set by a user. This results in page images of the printed papers. The created page images are stored in the memory 120.

In the operation of creating reduced page images (operation S230), the page images stored in the memory 120 are sequentially read in response to instructions of the controlling unit 130 to create the reduced page images that are copies of the page images reduced by a predetermined ratio. Such processes are accomplished in the image integration unit 150. In this case, an image compression ratio is determined. FIG. 6 shows an example of the image compression ratio.

Typically, a digital image consists of pixels formed by using a charge coupled device (CCD). The larger the number of pixels, the clearer an image. That is, an image composed of a larger number of pixels has a higher resolution view than an image composed of a fewer number of pixels. In addition, a resolution of a digital image can be expressed by a horizontal and vertical number of pixels.

Referring to FIG. 6, supposing a page image 600 and a reduced page image 601 are the same, the page image 600 has a resolution of 1,280×1,000 pixels (1,280,000 pixels) or 300 dpi, and its size is 35.28 cm×45.16 cm. However, the reduced page image 601 has a resolution of 640×480 pixels (307,200 pixels) or 72 dpi, and its size is 8.47 cm×10.84 cm. Such a compression can be accomplished by using a median representation, an average representation, and so on. Median representation involves replacing a block of pixels with its median value. For instance, when an n×n window is applied to image, pixels are read and are sorted to the ascending order according to their value. Then, a middle value of the sorted pixels is used for representing the pixels of the block. Average representation involves expressing a block of pixels with a mean value of all pixels in the block. As a result, as shown in FIG. 6, the image size can be adjusted according to the resolution.

According to the above method, page images stored in the memory 120 are sequentially read and are reduced to the size of the divided integrated page region, and the reduced page images are stored in the memory 120.

In the operation of creating integrated page images (operation S240), the image integration unit 150 reads the reduced page images in response to instructions of the controlling unit 130. The reduced page images are arranged in the divided integrated page region in a predetermined arrangement order. The predetermined arrangement order can be previously set by a user. Examples of predetermined arrangement orders (500 through 504) are shown in FIG. 5.

More specifically, when setting a first scan environment, a user can select an arrangement order among those shown in FIG. 5. They can be displayed on a liquid crystal display (not shown) on the terminal 180 or the operating panel equipment 140. The examples of predetermined arrangement orders (500 through 504) shown in FIG. 5 are merely shown as examples. Alternative arrangement orders may be selected by various methods.

The integrated page image created in the image integration unit is transmitted to the terminal (operation S250) or any other appropriate external device.

Figure 7:
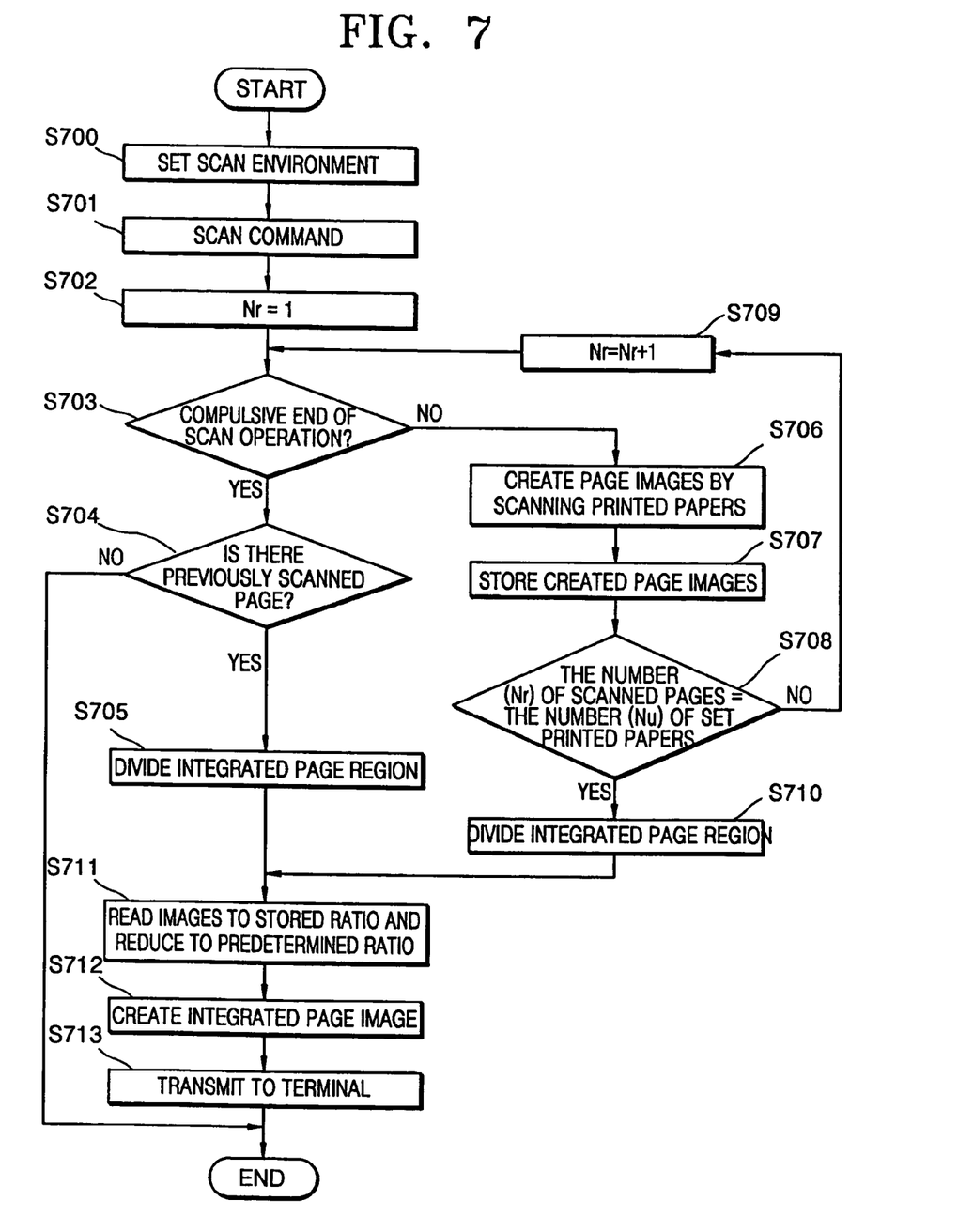
FIG. 7 is a flowchart illustrating a method of processing scanned images according to another embodiment of the present general inventive concept.

FIG. 7 is a flowchart illustrating a method of processing scanned images according to another embodiment of the present general inventive concept. Unlike the example shown in FIG. 2, this embodiment shows a case where a scanning interrupt command is transmitted to the controlling unit 130 of the image processing apparatus 100 from a user during the scanning process.

A user sets the scan environment (operation S700). The scan environment includes a scan resolution, a number of printed papers, and an arrangement order of the reduced page images.

A scanning is instructed by the user (operation S701).

A page number (Nr) is initialized to 1 (operation S702).

A determination is made whether a scanning interrupt command input from a user is received (operation S703). This determination is repeated as many times as the number of printed papers set by the user.

If there is no scanning interrupt command received, a plurality of page images corresponding to the printed papers are created by scanning the plurality of printed papers (operation S706). The page images created are stored in the memory 120 (operation S707).

The number (Nu) of printed papers set by a user and the present number (Nr) of scanned pages are compared (operation S708). If both are not equal, 1 is added to the number (Nr) of the scanned pages (operation S709). Operations S703, S706, S707, S708, and S709 are repeated as many times as the number (Nu) of the printed papers set by a user.

If the number (Nu) of printed papers set by a user and the present number (Nr) of scanned pages are equal, an integrated page image region is divided into small regions based on the number of the printed papers set by a user (operation S710). Because this division is the same as that shown in FIG. 2, a repetitive explanation will be omitted.

If the scanning interrupt command is transmitted to the controlling unit 130 from a user during the scanning, the controlling unit 130 searches for a page image remaining in the memory 120 (operation S704).

If the scanning is accomplished and the page images are stored in the memory 120 before the scanning interrupt command is transmitted from a user, the integrated page region is divided based on the number (Nr) of scanned images (operation S705). As a result, the number of scanned images is equal to the number of pages stored in the memory 120. The integrated page region is divided into an even number of page regions (operation S705) as shown in FIG. 3.

The stored page images are read and reduced by a predetermined ratio into reduced page images (operation S711). The predetermined ratio is the ratio of the size of the divided page region to the size of the scanned page image, and the predetermined ratio is determined based on the resolution of the scanned page image and a resolution of an integrated page image.

The reduced page images are arranged in an integrated page region according to an arrangement order set by a user to create one integrated image file (operation S712).

Finally, the created one integrated image file is transmitted to the terminal (operation S713).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of processing scanned images by an image processing apparatus which is able to connect to an external device, the method comprising:
   setting a scan environment by using the external device or by using an operating panel equipment of the image processing apparatus;
   scanning a plurality of printed papers;
   creating and storing a plurality of page images corresponding to the plurality of printed papers;
   creating and storing a plurality of reduced page images by reducing the plurality of page images by a predetermined ratio; and
   creating one integrated page image by reading the plurality of reduced page images and arranging the plurality of reduced page images in a predetermined arrangement order,
   wherein the operation of creating one integrated page image comprises forming an integrated page region when a multi scan request is input from the user, the forming of the integrated page region comprises:
      dividing the integrated page region into a plurality of page regions of which a number is equal to a number of the plurality of printed papers set by the user if the number of the plurality of printed papers set by the user is an even number, or
      dividing the integrated page region into an even number of page regions by adding 1 to the number of the plurality of printed papers set by the user if the number of the plurality of printed papers set by the user is an odd number.

2. The method according to claim 1, further comprising transmitting the integrated page image to an external device.

3. The method according to claim 1, wherein the two or more printed papers are fed manually and/or automatically.

4. The method according to claim 1, wherein the sizes of the divided page regions in the integrated page region are equal in size to one another.

5. The method according to claim 1, wherein the predetermined ratio is a ratio of the size of one of the plurality of page regions to the size of one of the scanned page images, and is determined based on a resolution of one of the plurality of page images and a resolution of the integrated page image.

6. The method according to claim 1, wherein the arrangement order is selected by the user from at least one predetermined format.

7. The method according to claim 1, wherein the scan environment is set by using a terminal and/or a liquid crystal display.

8. The method according to claim 1, wherein the scan environment includes a number of the printed papers to be scanned and an arrangement order of the reduced page images.

9. The method according to claim 1, further comprising:
   checking for an end of scan operation after creating and storing each of the plurality of page images;
   adding 1 to a number of scanned pages after creating and storing each of the plurality of page images; and
   repeating the checking and adding operations until an end of scan operation is received or the number of scanned pages equals a number of printed papers to be scanned entered by a user,
   wherein the integrated page region is divided into a plurality of page regions of which the number is equal to either the number of scanned pages or the number of scanned pages plus 1.

10. A method of processing scanned images by an image processing apparatus which is able to connect to an external device, the method comprising:
    setting a scan environment by using the external device or by using an operating panel equipment of the image processing apparatus;
    scanning two or more printed papers;
    creating a plurality of page images corresponding to the two or more printed papers;
    reducing the plurality of page images into a plurality of reduced page images; and
    arranging the plurality of reduced page images in an integrated page region to create an integrated page image, which comprises dividing the integrated page region into a plurality of page regions of which a number is equal to a number of the two or more printed papers set by the user if the number of the two or more printed papers set by the user is an even number, or dividing the integrated page region into an even number of page regions by adding 1 to the number of the two or more printed papers set by the user if the number of the two or more printed papers set by the user is an odd number.

11. An apparatus which includes an image processing apparatus which is able to connect to an external device to process scanned images, the apparatus comprising:
    an image creating means for creating a plurality of images for two or more printed papers by scanning the two or more printed papers;
    an image integration means for producing a plurality of reduced images by reducing the plurality of images and arranging the plurality of reduced images in one integrated page region; and
    a control means for controlling the image creating means and the image integration means,
    wherein the image integration means forms an integrated page region when a multi scan request is input from a user and divides the integrated page region into a plurality of page regions of which a number is equal to a number of the two or more printed papers set by the user if the number of the two or more printed papers set by the user is an even number, or divides the integrated page region into an even number of page regions by adding 1 to the number of the two or more printed papers set by the user if the number of the two of more printed papers set by the user is an odd number.

12. The apparatus according to claim 11, further comprising a storage means for storing the plurality of images created in the image creating means and the plurality of reduced images created in the image integration means.

13. The apparatus according to claim 12, wherein the control means controls the image creation means to create the plurality of images by scanning the two or more printed papers, controls the image integration means to create the plurality of reduced images by reducing the plurality of images created in the image creation means and to create one integrated image by arranging the plurality of reduced images in the integrated page region, and controls the storage means to store the plurality of images and the plurality of reduced images.

14. An apparatus which includes an image processing apparatus which is able to connect to an external device to process scanned images, the apparatus comprising:

an image integration unit to receive a plurality of scanned images, to create a plurality of reduced images from the plurality of scanned images, and to create an integrated page image by arranging the plurality of reduced images in a predetermined order;

a controlling unit to control the image integration unit;

an optical module to create the plurality of images by scanning two or more printed papers in a predetermined resolution; and a memory to store the plurality of images and the plurality of reduced images, wherein the image integration unit divides the integrated page into a plurality of page regions of which a number is equal to a number of the plurality of scanned images if the number of the plurality of scanned images is an even number, or divides the integrated page region into an even number of page regions by adding 1 to the number of the plurality of scanned images if the number of the plurality of scanned images is an odd number.

15. The apparatus according to claim 14, further comprising:

an automatic sheet feeder cassette to feed the printed papers to the apparatus to process scanned images.

16. The apparatus according to claim 14, further comprising:

an operating panel device to receive a number of the two or more printed papers to be scanned and the predetermined order.

17. The apparatus according to claim 16, wherein the number of the two or more printed papers to be scanned and the predetermined order are selected from either a terminal or a liquid crystal display.

18. The apparatus according to claim 14, further comprising:

an I/O interface unit to interface with an external device.

19. An apparatus which includes an image processing apparatus which is able to connect to an external device to process scanned images, the apparatus comprising:

an optical module to create a plurality of images corresponding to two or more printed papers by scanning the two or more printed papers;

an image integration unit to produce a plurality of reduced images by reducing the plurality of images and arranging the plurality of reduced images in at least one integrated page region;

a controlling unit to control the optical module and the image integration unit; and a storage device to store the plurality of images created by the optical module and the plurality of reduced images created by the image integration unit, wherein the image integration unit divides the integrated page into a plurality of page regions of which a number is equal to a number of the plurality of images if the number of the plurality of images is an even number, or divides the integrated page region into an even number of page regions by adding 1 to the number of the plurality of images if the number of the plurality of images is an odd number.

20. A method of processing scanned images by an image processing apparatus which is able to connect to an external device, comprising:

scanning a plurality of images;

reducing plurality of scanned images; and generating an arranged image that includes a plurality of page regions where each of the plurality of page regions corresponds to one of the plurality of reduced scanned images, which comprises forming the plurality of page regions to be equal to the number of the plurality of scanned images if the number of the plurality of scanned images is an even number, or forming the plurality of page sections to be an even number of page regions by adding 1 to the number of the plurality of scanned images if the number of the plurality of scanned images is an odd number.

21. An apparatus which includes an image processing apparatus which is able to connect to an external device to process scanned images, comprising:

a scanning unit to scan a plurality of images;

an integration unit to reduce the plurality of scanned images and to generate an arranged image that includes a plurality of page regions where each of the plurality of page regions corresponds to one of the plurality of reduced scanned images; and a controller to control the scanning unit and the integration unit, wherein the integration unit forms the plurality of page regions to be equal to the number of the plurality of scanned images if the number of the plurality of scanned images is an even number, or forms the plurality of page regions to be an even number of page regions by adding 1 to the number of the plurality of scanned images if the number of the plurality of scanned images is an odd number.

* * * * *